US012601879B2

(12) United States Patent
Cloud et al.

(10) Patent No.: US 12,601,879 B2
(45) Date of Patent: Apr. 14, 2026

(54) FLEXIBLE PUSH-PULL BOOT WITH A TRANSITION MEMBER

(71) Applicant: US Conec Ltd., Hickory, NC (US)

(72) Inventors: Mitchell Cloud, Hickory, NC (US);
Craig M. Conrad, Hickory, NC (US);
Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 588 days.

(21) Appl. No.: 17/965,169

(22) Filed: Oct. 13, 2022

(65) Prior Publication Data

US 2023/0031728 A1 Feb. 2, 2023

Related U.S. Application Data

(63) Continuation of application No. 17/126,493, filed on Dec. 18, 2020, now Pat. No. 11,474,308.

(60) Provisional application No. 62/949,708, filed on Dec. 18, 2019.

(51) Int. Cl.
*G02B 6/38* (2006.01)

(52) U.S. Cl.
CPC ......... *G02B 6/3887* (2013.01); *G02B 6/3825* (2013.01); *G02B 6/3893* (2013.01)

(58) Field of Classification Search
CPC ... G02B 6/3887; G02B 6/3825; G02B 6/3893
USPC ........................................................ 385/78
See application file for complete search history.

(56) References Cited

U.S. PATENT DOCUMENTS

| | | | |
|---|---|---|---|
| 8,559,781 B2 | 10/2013 | Childers et al. | |
| 9,989,712 B1 | 6/2018 | Takano et al. | |
| 10,114,180 B2 | 10/2018 | Suzic | |
| D860,142 S | 9/2019 | Childers et al. | |
| 10,520,685 B2 | 12/2019 | Watanabe | |
| 10,663,678 B2 | 5/2020 | Andres | |
| 10,705,300 B2 | 7/2020 | Takano et al. | |
| 2012/0057826 A1 | 3/2012 | Katoh | |
| 2013/0156387 A1* | 6/2013 | Takeuchi | G02B 6/3801 |
| | | | 385/98 |
| 2013/0343706 A1 | 12/2013 | Droesbeke et al. | |
| 2020/0150357 A1 | 5/2020 | Higley et al. | |
| 2020/0278502 A1 | 9/2020 | Baelen | |
| 2021/0191053 A1 | 6/2021 | Cloud et al. | |

FOREIGN PATENT DOCUMENTS

| | | | | |
|---|---|---|---|---|
| WO | WO-2019195652 A1 * | 10/2019 | | G02B 6/3825 |
| WO | 2020252048 A1 | 12/2020 | | |

* cited by examiner

*Primary Examiner* — Jerry M Blevins
(74) *Attorney, Agent, or Firm* — Michael L Leetzow PLLC; Shubhrangshu Sengupta

(57) ABSTRACT

A flexible push-pull boot extends between a front end and a rear end, a rear portion has a spine and a plurality of ribs extending from the rear end toward the front end. There is also a middle portion from which a plurality of front extensions extend. At least one of the front extensions has an inwardly extending projection on an inside portion of the front extensions to retain a housing therebehind.

20 Claims, 6 Drawing Sheets

FLEXIBLE PUSH-PULL BOOT WITH A TRANSITION MEMBER

REFERENCE TO RELATED CASE

This application claims priority under 35 U.S.C. § 119 (e) to U.S. provisional application No. 62/949,708 filed on Dec. 18, 2019, and under 35 U.S.C. § 120 to U.S. patent application Ser. No. 17/126,493, the contents of which are hereby incorporated by reference in their entirety.

BACKGROUND OF THE INVENTION

In buildings where fiber optic connectors are being installed, there is a limited amount of space in which fiber optic connectors can be installed. In order to increase the number of fiber optic connectors to meet the increasing demand, there either needs to be more space or the fiber optic connectors need to be smaller. As the fiber optic connectors become smaller, it is more difficult to install and remove them. In order to remove them, one has to grab either an outer sleeve or a tab that is attached to an outer sleeve of the fiber optic connector. This is becoming increasingly difficult as the fiber optic connectors become smaller and the installations become denser. Additionally, optical fiber cables can become tangled around push-pull tabs that are conventionally used to remove the connectors. One other structure that may be used to install fiber optic connectors is the strain relief boot. An installer can push on the boot, which in turn exerts a force on the fiber optic connector to secure it in a receptacle. However, pulling on a boot to remove the fiber optic connector, particularly a boot that does not have the appropriate connections to the fiber optic connector, may damage the fiber optic connector. Boots are not typically connected to the outer housing, which is used to disengage the fiber optic connector from the receptacle.

Thus, there is a need for a boot that can be used to insert into and remove from a receptacle a fiber optic connector that does not pinch the optical fibers, destroy the boot, and/or damage the fiber optic connector.

SUMMARY OF THE INVENTION

The present invention is directed to a flexible boot for a fiber optic connector, the fiber optic connector having a housing, the flexible boot includes a rear portion having a spine and a plurality of ribs, a middle portion having an interior surface and an exterior surface, a transition portion disposed between the rear and the middle portions, a plurality of front extensions extending forwardly from the middle portion, a central opening extending between the transition portion and an end of the rear portion, the central opening configured to receive at least a portion of a fiber optic cable and having a variable diameter, and at least one inwardly extending projection formed on one of the front extensions extending toward the central opening, wherein the flexible push-pull boot is configured to have a stiffness along a length of the spine in a direction parallel to the longitudinal axis but is flexible in other directions.

In some embodiments, the plurality of front extensions comprises four front extensions and the at least one inward extending projection comprises two inward extending projections.

In some embodiments, the flexible boot has a longitudinal axis and the spine extends from the end of the rear portion to the transition portion and parallel to the longitudinal axis.

In some embodiments, a groove is disposed between the plurality of front extensions and the middle portion to receive a projection of the fiber optic connector housing.

In other embodiments, the groove has at least one rearward facing surface and at least one forward facing surface, the rearward facing surface engaging the housing when the connector is being removed and the forward facing surface engaging the housing when the connector is being inserted.

In yet another aspect, there is a flexible boot for a fiber optic connector, the fiber optic connector having a housing, the flexible boot includes a front end, a rear end, a rear portion having a spine and a plurality of ribs extending from the rear end toward the front end, a middle portion, a plurality of front extensions extending forwardly from the middle portion, and an inwardly extending projection formed on an inside portion of at least one of the plurality of the front extensions and extending toward another of the plurality of front extensions, wherein the flexible push-pull boot is configured to have a stiffness along a length of the spine but is flexible in other directions.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
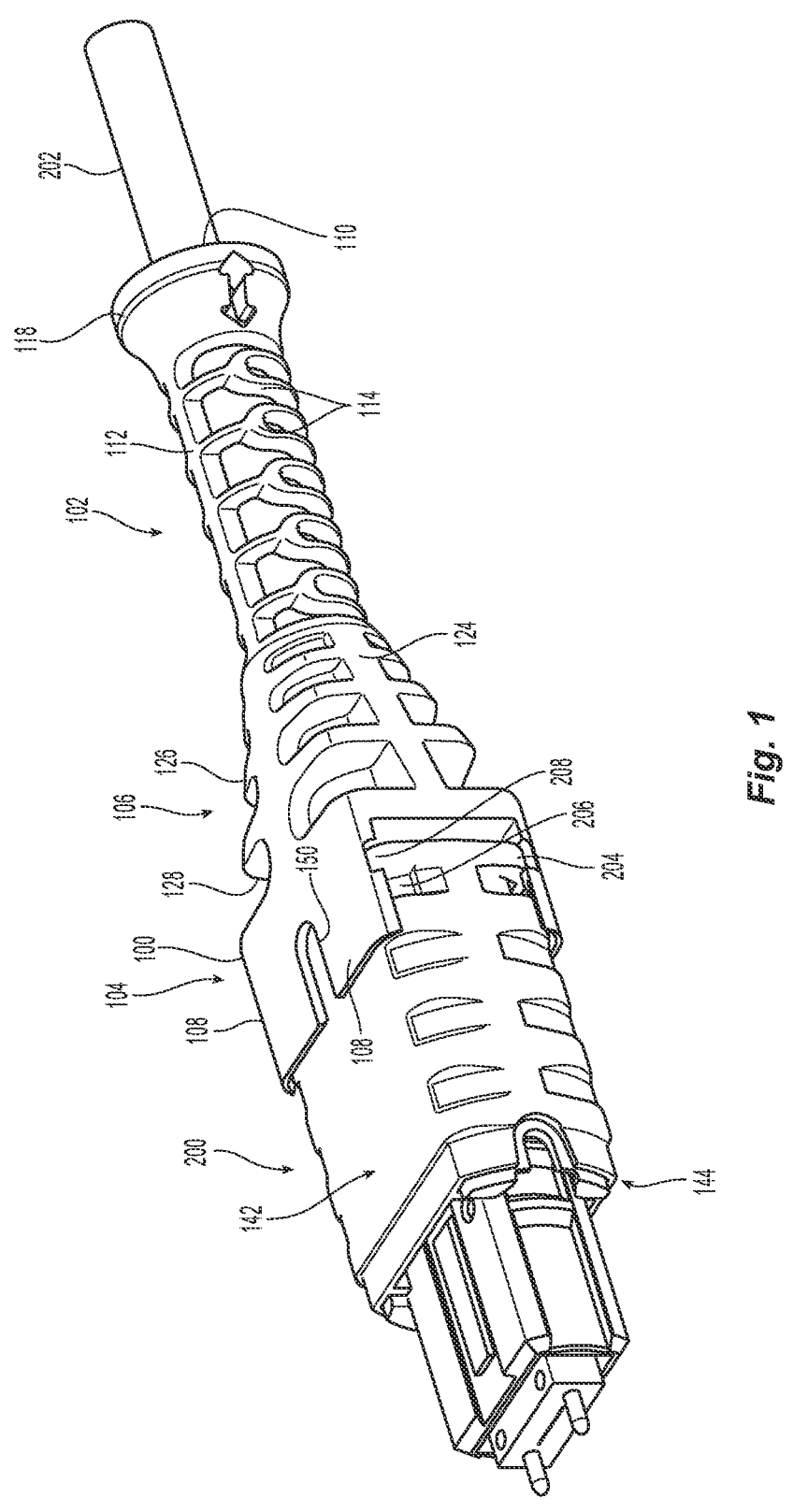
FIG. 1 is a perspective view of one embodiment of a flexible boot for a fiber optic connector according to the present invention, the flexible boot attached to the fiber optic connector.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule, the fiber optic connector, or the ferrule push. Each of the components will therefore have a front and rear, and the two fronts or forward portions of the fiber optic ferrules would engage one another. Thus, in FIG. 1, the "front" of the fiber optic connector and the flexible boot is on the left side and "forward" is to the left and out of the page. "Rearward" or "rear" is that part of the fiber optic connector or flexible boot that is on the right side of the page and "rearward" and "backward" is toward the right and into the page.

One embodiment of a flexible boot 100 (or, flexible push-pull boot 100) attached to a fiber optic connector 200 with an optical fiber cable 202 is illustrated in FIG. 1. The fiber optic connector 200 has a housing 204 (or sleeve), the housing 204 has slots or openings 206 in the housing and therefore also has projections or ribs 208 that extend outward from the housing 204. The housing 204 may be similar to the sleeve in U.S. Pat. No. D860,142, owned by the applicant of this application, and incorporated herein by reference in its entirety. The fiber optic connector is illustrated to be an MPO connector, but other configurations of fiber optic connectors may also be used.

The flexible boot 100 has a rear portion 102, a middle portion 104, a transition portion 106 disposed between the rear portion 102 and the middle portion 104, and a plurality of front extensions 108 extending forwardly from the middle portion 104.

The rear portion 102 extends between a rear end 110 and the transition portion 106. The rear portion 102 has a spine 112 and a plurality of ribs 114. The spine 112 extends from the rear and 110 to the transition portion 106 and is parallel, or generally parallel, to the longitudinal axis A. Alternatively, the spine 112 may not be parallel to the longitudinal axis A. See FIG. 3. The plurality of ribs 114 generally extend around the rear portion 102. This configuration allows for the flexible boot 100 to flex in all directions except along the longitudinal axis A and towards the transition portion 106 and a front end 116 of the flexible boot 100. That is, the flexible boot 100 is configured to have a stiffness along a length of the spine 112 in a direction parallel to the longitudinal axis A but is flexible in other directions. For example, the flexible boot 100 can bend in a direction perpendicular to the longitudinal axis A. The rear portion 102 also includes a grasping portion 118 at the rear end 110. As discussed in more detail below, the spine 112, the ribs 114, and the grasping portion 118 combine to form a portion of a central opening 120. See, e.g., FIG. 3.

Figure 2:
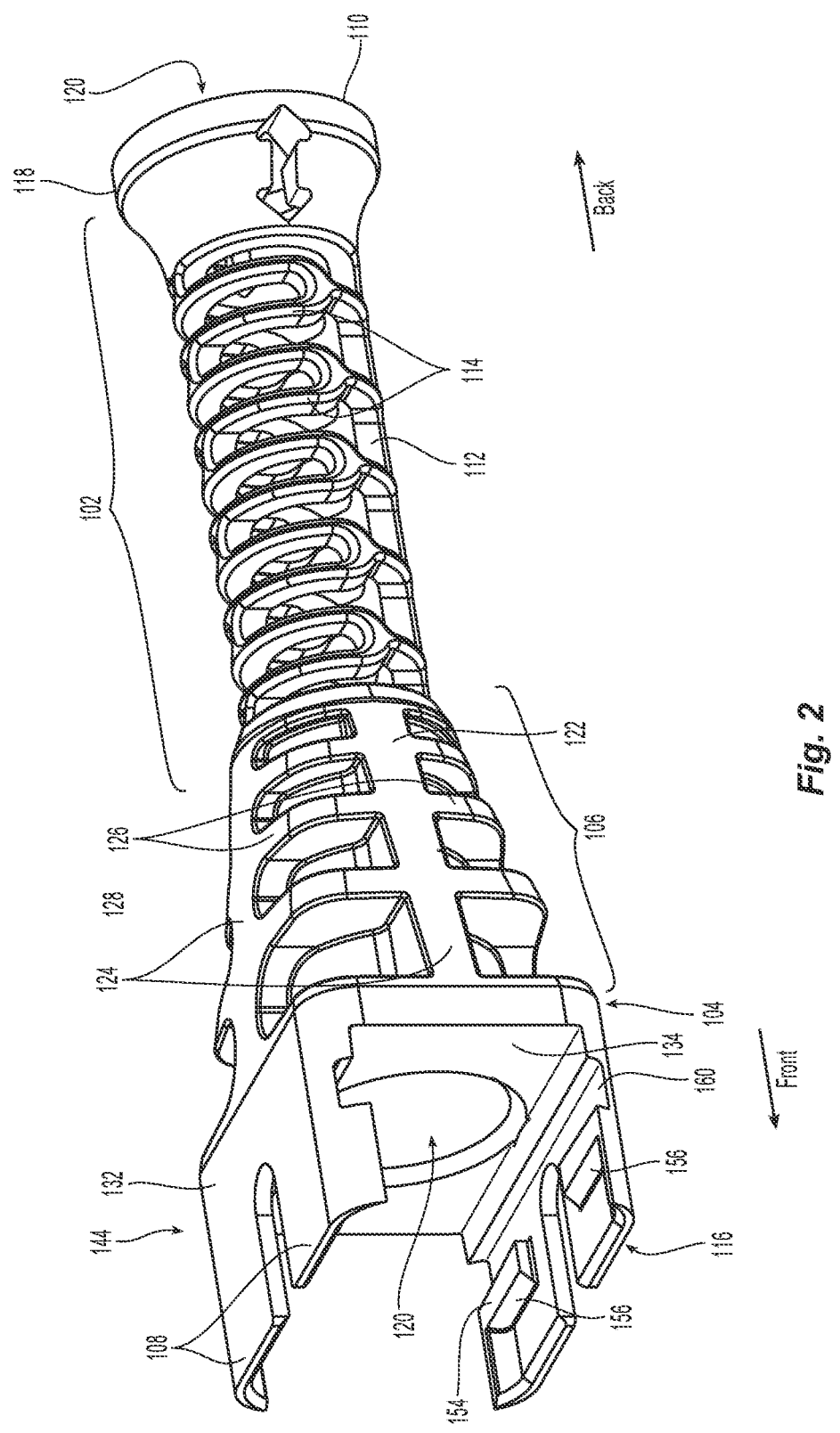
FIG. 2 is a perspective view of the flexible boot for a fiber optic connector in FIG. 1 in an inverted position.
Figure 3:
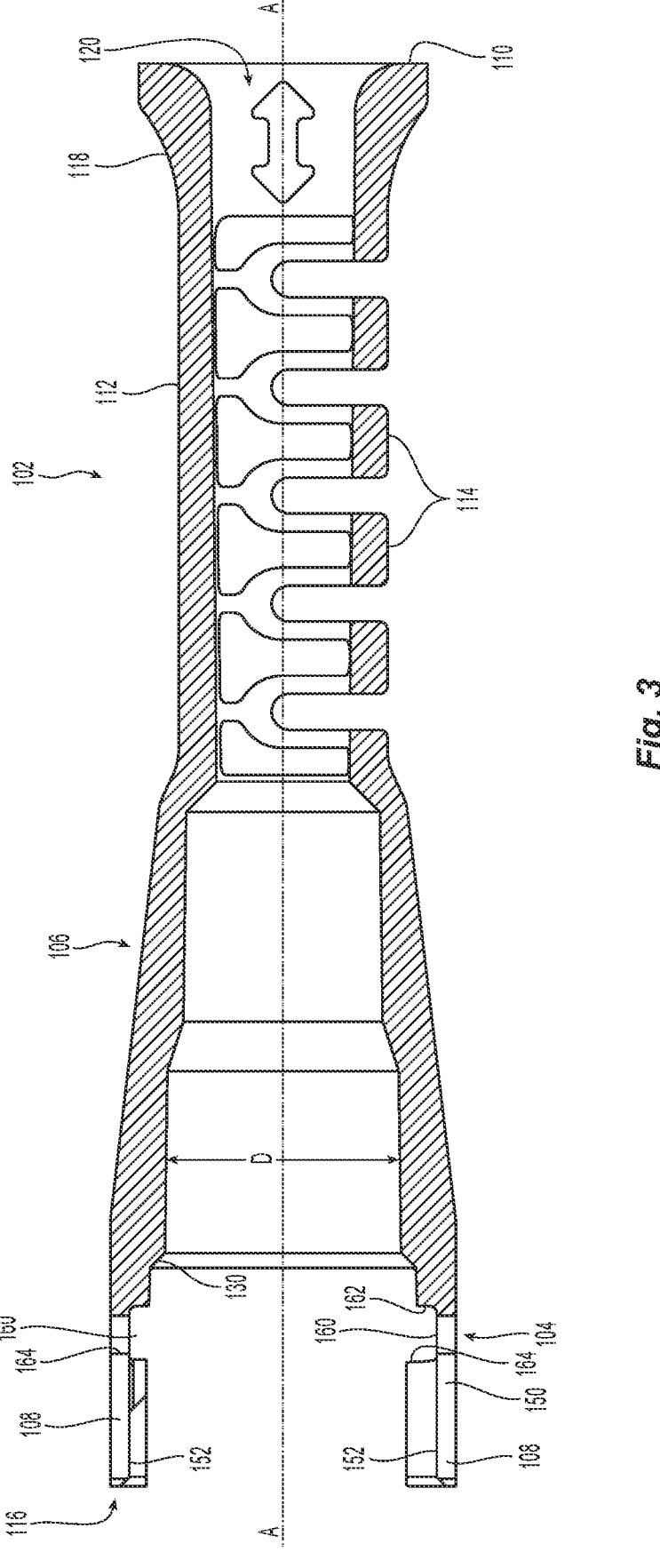
FIG. 3 is an elevation view of a cross-section of the flexible boot for a fiber optic connector in FIG. 1.
Figure 4:
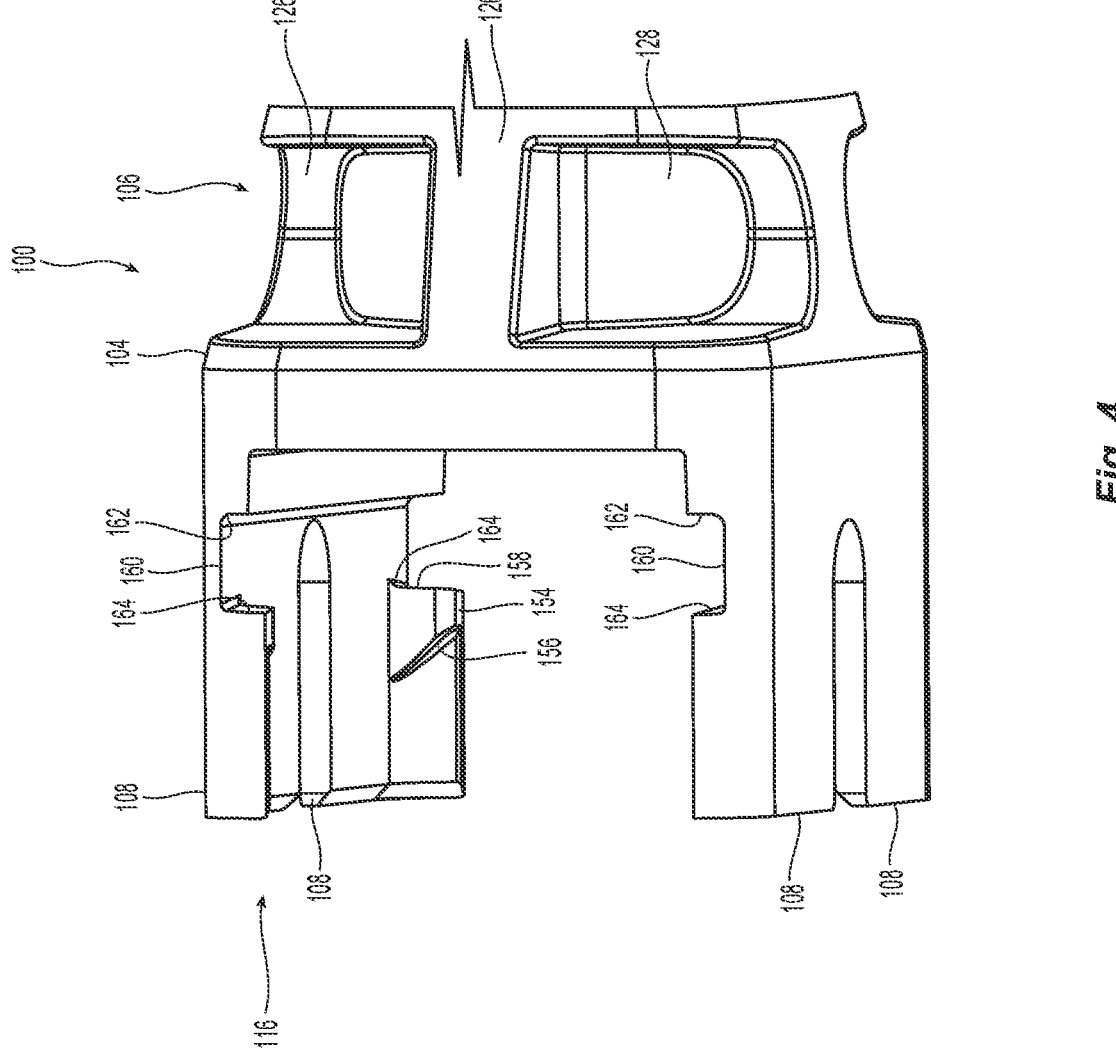
FIG. 4 is an enlarged perspective view from the bottom of the front end of the flexible for a fiber optic connector in FIG. 1.

The transition portion 106 is disposed between the rear portion 102 and the middle portion 104. The transition portion 106 becomes larger moving from the rear portion 102 to the middle portion 104. Preferably, the exterior surface 122 has a number of central members 124 that extend from the rear portion 102 towards the middle portion 104 and generally in a direction parallel to the longitudinal axis A. The central members 124 have a plurality of cross members 126 extending therebetween. The cross members 126 generally extend around the transition portion 106 (and generally orthogonal to the longitudinal axis A), and join the central members 124. There are gaps 128 between each of the crossmembers 126. As seen in FIGS. 2 & 3, the transition portion 106 extends the central opening 120 from the rear portion 102 through the transition portion 106. Preferably, the central opening 120 has a diameter D that varies along the length of the central opening 120. It is preferable that the diameter D decreases overall from a front portion 130 of the transition portion 106 to the rear end 110. This reduction assists with the management of the optical fiber cable 202 as it runs from the rear end 110 to the front end 116 of the flexible boot 100. Such reduction in the diameter D will also accommodate a crimp body (not shown) when the fiber optic connector 200 is assembled.

Forward of the transition portion 106 is the middle portion 104. The middle portion 104 circumferentially surrounds the central opening 120 at the front portion 130, and has an outer surface 132 and an interior surface 134. The middle portion 104 also includes a forward facing surface 136.

Extending from the middle portion 104 are a plurality of front extensions 108. As illustrated in the figures, the flexible boot 100 has four of the front extensions 108. Two of the front extensions 108 are on a top side 142 of the fiber optic connector 200 and two of the front extensions 108 are on a bottom side 144 of the fiber optic connector 200. The top and bottom sides (142,144) are in reference to the longer side of the fiber optic connector 200, when viewed from the front side of the fiber optic connector 200. Separating the front extensions 108 on each of the sides of the fiber optic connector 200 are cut outs 150. See, e.g., FIGS. 1 and 2. As illustrated in the figure, the cut outs 150 extend from the front end 116 rearwardly toward the middle portion 104. The cut outs 150 allow the front extensions 108 to slightly deform to slide over the housing 204. The deeper the cut outs 150, the more flexible the front extensions 108 are to allow for the engagement with the housing 204.

Each of the front extensions 108 has an interior surface 152 facing an opposing interior surface 152 of the opposing front extensions 108. See, e.g., FIG. 3. Extending upward from interior surfaces 152 may be inward extending projections 154. The inward extending projections 154 preferably have a forward facing ramp 156 and a flat rearward facing surface 158. The rearward facing surface 158 faces the middle portion 104. While only two of the front extensions 108 are illustrated as having the inward extending projections 154, it is possible to have more or fewer thereof. The forward facing ramp 156 would engage the housings 204 and cause the front extensions 108 to flex upward as the housing is pushed on by the flexible boot 100, thereby allowing the housing 204 to be disposed behind the inward extending projections 154.

Figure 5:
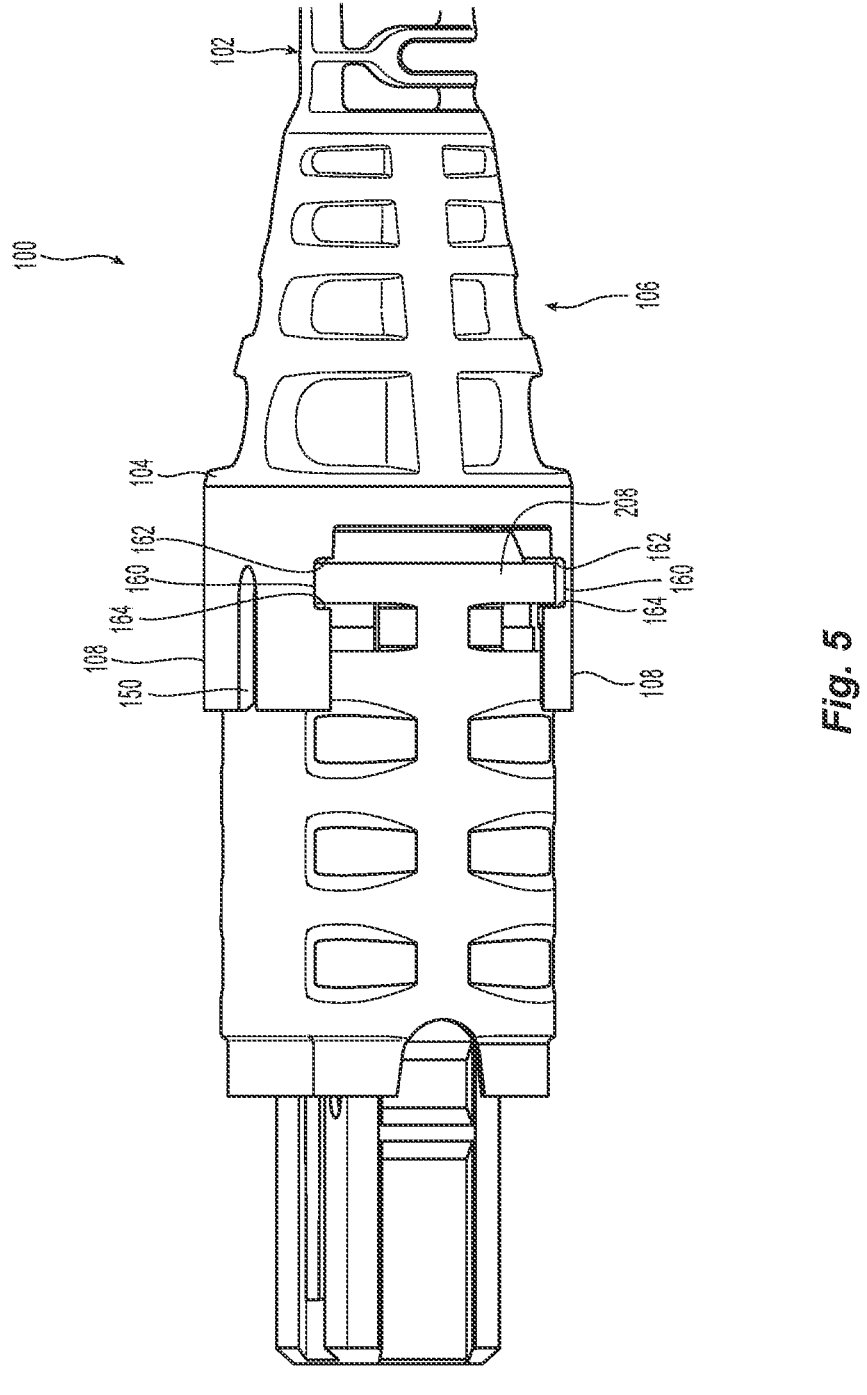
FIG. 5 is a Side elevation view of the flexible boot in FIG. 1 engaging the housing of a fiber optic connector.

The front extensions 108 on each of the sides (142, 144) may each have a transverse groove 160 that extends between the short sides of the flexible boot 100 and the fiber optic connector 200 and between the inward extending projections 154 and the middle portion 104. Preferably the grooves 160 are sized to receive the projections or ribs 208 that extend outward from the housing 204. See FIG. 5. The grooves 160 have a forward facing surface 162 and a rearward facing surface 164, which form a portion of the groove 160. The rearward facing surface 164 and the rearward facing surface 158 may be in the same plane. The forward facing surface 162 is to engage a rearward surface of the projections or ribs 208, while the rearward facing surface 164 will engage a forward facing surface of the projections or ribs 208. Thus, when one pulls on the flexible boot 100, the rearward facing surface 164 engages a forward facing surface of the projections or ribs 208, which releases the fiber optic connector 200 from the receptacle. Conversely, when the user pushes on the flexible boot 100, the forward facing surface 162 engages a rearward surface of the projections or ribs 208, and allows the fiber optic connector to be received in the receptacle. The attachment of the flexible boot 100 to the housing 204 allows for a pull strength of the order of 10 N and a push strength of at least 20 N.

Figure 6:
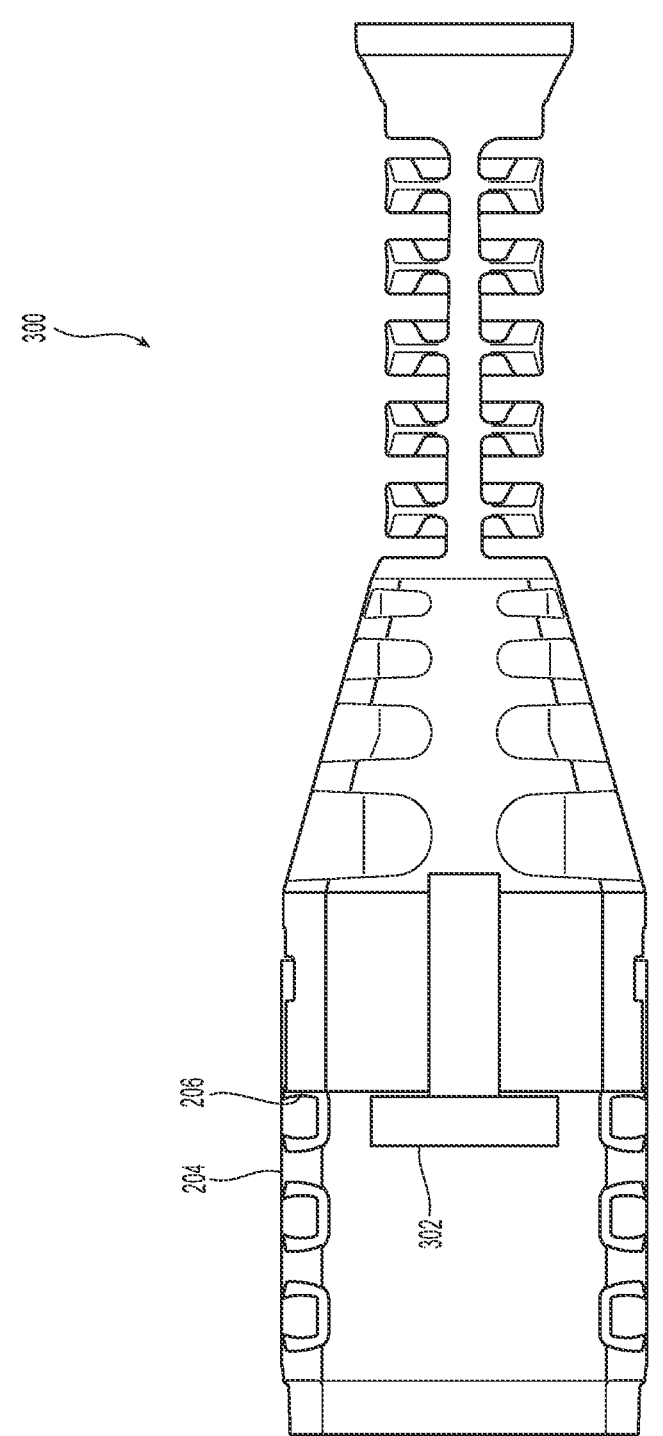
FIG. 6 is an alternative embodiment of a flexible boot for a fiber optic connector according to the present invention.

An alternative embodiment of a flexible boot 300 is illustrated in FIG. 6. In this embodiment, rather than the front extensions 108, there is a t-shaped extension 302 that extends across a portion of the housing 204. The t-shaped extension 302 would have projections that extend into the slots or openings 206 of the housing 204. There would be a similar extension on the underside of the connector illustrated in FIG. 6. Alternatively, that second extension on the underside may be optional.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A push-pull boot for a fiber optic connector, the fiber optic connector having an outer housing, the push-pull boot comprising:

a main body having a rear portion, a transition portion forward of the rear portion, and a middle portion forward of the transition portion along a longitudinal axis, wherein a plurality of optical fibers of an optical cable jacket are supported within the transition portion and the middle portion by a continuous central opening; and a pair of front extensions extending forwardly from a top side and/or a bottom side of the middle portion, the push-pull boot having a rear facing surface on the front extensions to engage a forward facing surface of the outer housing of the fiber optic connector.

2. The push-pull boot of claim 1, wherein the rear portion includes a longitudinal spine and a plurality of ribs attached to the longitudinal spine to form a part of the continuous central opening that receives the plurality of optical fibers of the optical cable jacket.

3. The push-pull boot of claim 1, wherein the rear facing surface is provided at a front end of each of the pair of front extensions.

4. The push-pull boot of claim 1, wherein the continuous central opening has a variable diameter.

5. The push-pull boot of claim 1, wherein each of the pair of front extensions has at least one inwardly extending projection extending toward the continuous central opening, and wherein the rear facing surface on the front extensions is on the at least one inwardly extending projection.

6. The push-pull boot of claim 5, wherein the at least one inwardly extending projection on each of the pair of front extensions comprises two inwardly extending projections.

7. The push-pull boot of claim 1, wherein a groove is disposed on each of the pair of front extensions forward of the middle portion to receive a projection of the outer housing of the fiber optic connector.

8. The push-pull boot of claim 7, wherein the groove is bound by the rear facing surface and at least one forward facing surface, the rear facing surface engaging the outer housing when the fiber optic connector is being removed from a receptacle and the at least one forward facing surface engaging the outer housing when the fiber optic connector is being inserted into the receptacle.

9. The push-pull boot of claim 1, wherein the transition portion includes a plurality of central members extending in a direction parallel to the longitudinal axis and a plurality of cross-members extending between the central members in a direction orthogonal to the longitudinal axis.

10. A flexible boot for an MPO fiber optic connector, the MPO fiber optic connector having a housing, the flexible boot comprising:

a front end;

a rear end;

a rear portion having a spine and a plurality of ribs, the rear portion extending from the rear end toward the front end along a longitudinal axis and supporting an optical fiber cable of the MPO fiber optic connector;

a middle portion through which the optical fiber cable passes;

a plurality of front extensions extending forwardly from the middle portion; and an inwardly extending projection formed on an inside portion of at least one of the plurality of the front extensions and extending toward another of the plurality of front extensions, wherein the flexible boot is configured to have a stiffness along a length of the spine but is flexible in other directions.

11. The flexible boot for the MPO fiber optic connector of claim 10 further comprising:

a transition portion disposed between the rear portion and the middle portion; and a central opening extending between the transition portion and the rear portion, the central opening having a variable diameter and configured to receive at least a portion of the optical fiber cable.

12. The flexible boot for the MPO fiber optic connector of claim 11, wherein the variable diameter of the central opening is larger at the middle portion than at an end of the rear portion where the optical fiber cable enters the rear portion.

13. The flexible boot for the MPO fiber optic connector of claim 11, wherein the flexible boot has a longitudinal axis and the spine extends from the rear end to the transition portion and is substantially parallel to the longitudinal axis.

14. The flexible boot for the MPO fiber optic connector of claim 10, wherein a groove is disposed between the plurality of front extensions and the middle portion to receive a projection of the housing of the MPO fiber optic connector.

15. The flexible boot for the MPO fiber optic connector of claim 14, wherein the groove has at least one rear facing surface and at least one forward facing surface, the rear facing surface engaging the housing when the MPO fiber optic connector is being removed from a receptacle and the forward facing surface engaging the housing when the MPO fiber optic connector is being inserted into the receptacle.

16. An MPO fiber optic connector comprising:

an inner housing;

a multi-fiber ferrule supported by the inner housing, the multi-fiber ferrule supporting a plurality of optical fibers of a fiber optic cable;

an outer housing surrounding the inner housing and slidable along a length of the inner housing; and a push-pull boot engaged to the outer housing, the push-pull boot having a rear portion, a transition portion forward of the rear portion, a middle portion forward of the transition portion, and a pair of front extensions extending forwardly from a top side and/or a bottom side of the middle portion, wherein the push-pull boot has a rear facing surface on each of the pair of front extensions to engage a forward facing surface of the outer housing of the MPO fiber optic connector, and wherein the push-pull boot is configured to have a stiffness along a longitudinal axis thereof but is flexible in other directions.

17. The MPO fiber optic connector of claim 16, wherein the rear portion includes a longitudinal spine and a plurality of ribs attached to the longitudinal spine to form a part of a central opening that receives at least a portion of the fiber optic cable.

18. The MPO fiber optic connector of claim 16, wherein the rear facing surface is provided at a front end of each of the pair of front extensions.

19. The MPO fiber optic connector of claim 16, wherein each of the pair of front extensions has at least one inwardly extending projection extending toward a central opening through which the fiber optic cable passes, and wherein the rear facing surface is on the inwardly extending projection.

20. The MPO fiber optic connector of claim 16, wherein a groove is disposed on each of the pair front extensions forward of the middle portion to receive a projection of the outer housing of the MPO fiber optic connector.

\*   \*   \*   \*   \*